United States Patent [19]

Takai

[11] Patent Number: 5,313,608
[45] Date of Patent: May 17, 1994

[54] MICROPROCESSOR WITH CACHE MEMORY FOR SUPPORTING DEBUGGING OPERATIONS

[75] Inventor: Hiroyuki Takai, Tokyo, Japan

[73] Assignee: Kabushiki Kaisha Toshiba, Kawasaki, Japan

[21] Appl. No.: 661,314

[22] Filed: Feb. 27, 1991

[30] Foreign Application Priority Data

Feb. 27, 1990 [JP] Japan .................................. 2-44555

[51] Int. Cl.$^5$ ............................................. G06F 13/32
[52] U.S. Cl. .............................. 395/425; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,527,236 | 7/1985 | Ermolovich | 395/575 |
| 4,635,193 | 1/1987 | Moyer et al. | 395/375 |
| 4,791,550 | 12/1988 | Stevenson et al. | 395/650 |
| 4,802,085 | 1/1989 | Levy et al. | 395/375 |
| 4,860,195 | 8/1989 | Krauskopf | 395/400 |
| 5,053,949 | 10/1991 | Allison et al. | 395/375 |

Primary Examiner—Joseph L. Dixon
Assistant Examiner—Reba I. Elmore
Attorney, Agent, or Firm—Foley & Lardner

[57] ABSTRACT

A microprocessor consists of an arithmetic section for executing arithmetic processing with a program, a holding circuit for holding a designated address AD1 at which a piece of data DA1 is stored in an external memory, and a signal generating circuit for generating a signal when the designated address AD1 transmitted from the arithmetic section to the external memory is detected. The arithmetic section is provided with a cache memory for storing pieces of data, a tag memory for storing addresses at which the pieces of data are stored in the cache memory, a writing circuit for tagging the designated address AD1 stored in the tag memory after receiving the signal generated in the signal generating circuit, an arithmetic unit for executing arithmetic processing with the data stored in the cache memory, a brake signal generating circuit for generating a brake signal when the data DA1 stored at the designated address AD1 tagged is accessed by the arithmetic unit, and a control section for braking arithmetic processing executed in the arithmetic unit at a designated step of the program when the brake signal is provided from the circuit. The program used in the arithmetic unit is debugged after the arithmetic processing is braked.

8 Claims, 2 Drawing Sheets

MICROPROCESSOR WITH CACHE MEMORY FOR SUPPORTING DEBUGGING OPERATIONS

BACKGROUND OF THE INVENTION

1. Field of the Invention

The present invention relates to a microprocessor with a cache memory in which debugging operations are supported, and, in particular, to a microprocessor with a cache memory in which functions for implementing debugging operations are improved.

2. Description of the Background Art

Debugging operations are generally executed to debug in programming in a microprocessor applied system to develop the system.

In detail, a program stored in the system is actually executed before the debugging operations are executed. Thereafter, for example, pieces of data transmitted on an external bus connected to an external memory are monitored. The execution of the program is braked when arithmetic processing is advanced to a designated address or when designated conditions such as access to a piece of designated data are accomplished. After braking the execution of the program, contents of registers and memories are displayed. Also, instructions executed during the arithmetic processing are listed up. Therefore, an operator can debug the program stored in the program.

In this case, the system is generally provided with a plurality of microprocessors which are connected with a cache memory, an arithmetic unit and a control unit. In addition, the system is provided with an external memory connected with the microprocessors to store a large pieces of data, and external buses through which pieces of data, instructions or addresses are transmitted between the microprocessors and/or between the microprocessor and the external memory.

However, there are drawbacks to execute the debugging operations in cases where a program executed in a microprocessor with a cache memory is debugged.

That is, the debugging operations are initially executed according to normal operations.

In detail, in cases where a piece of data is stored at an address of the cache memory, an address hit occurs in the microprocessor when the address is accessed by the arithmetic unit during the execution of the program. Thereafter, under control of the control section, the data stored at the address is read out from the cache memory to utilize in the arithmetic unit or is rewritten to another piece of data which is made in the arithmetic unit. Therefore, an operation accessing to the external memory is not executed in the microprocessor. In other words, instructions or pieces of data transmitted between the cache memory and the arithmetic unit cannot be detected even though the operation accessed from the microprocessor to the external bus is monitored.

On the other hand, in cases where a piece of data is not stored at an address of the cache memory, a cache miss occurs in the microprocessor when the data is accessed by the arithmetic unit during the execution of the program. Thereafter, the data is fetched from the external memory through the external bus to store at the address of the cache memory.

The above debugging operations are executed in the same manner as the normal operations.

In this case, the data transmitted on the external bus is monitored by a data detector. Therefore, in cases where the arithmetic processing executed in the arithmetic unit is scheduled to be braked according to the debugging operations when a piece of data DA0 relating to the cache miss is fetched from the external memory, the data DA0 is detected when the data DA0 is transmitted on the external bus. This operation is one of the debugging operations and is not executed in the normal operation.

Accordingly, the arithmetic processing executed in the arithmetic unit can be braked to debug the program executed in the arithmetic unit.

However, it has been recently required to improve the speed of the arithmetic processing during the normal operation. Therefore, in cases where the cache miss occurs, a group of pieces of data is fetched in a block unit from the external memory to improve the speed of the arithmetic processing. The pieces of data fetched in a block unit are likely to be utilized in the arithmetic unit in serial order.

Therefore, as shown in FIG. 1, in cases where the arithmetic processing executed in the arithmetic unit is scheduled to be braked according to the debugging operations when a piece of data DA2 relating to the cache miss is fetched from the external memory, a data signal requiring a piece of data DA1 is, for example, transmitted to the external memory through an external bus when the data DA1 is accessed by the arithmetic unit in the microprocessor and a cache miss occurs. Thereafter, a group of sequential pieces of data DA1 to DA4 is fetched from the external memory into the cache memory in serial order. That is, the sequential pieces of data DA1 to DA4 are stored at addresses AD1 to AD4 of the cache memory. In this case, the data DA2 is not detected by a data detector because the data DA2 is not required by the data signal even though the data DA2 is fetched into the cache memory from the external memory.

Thereafter, the data DA1 stored at the address AD1 of the cache memory is read out from the cache memory to utilize for the arithmetic processing in the arithmetic unit. Thereafter, the data DA2 stored at the address AD2 of the cache memory is read out from the cache memory without the occurance of the cache miss.

Therefore, it is impossible to specify the data DA2 accessed by the arithmetic unit in the microprocessor even though data signals transmitted through the external bus are monitorred without monitorring a piece of data processed in the arithmetic unit.

Also, even though the data DA2 is detected by the data detector when the sequential pieces of data DA1 to DA4 are stored at addresses AD1 to AD4 of the cache memory, the data DA2 is not necessarily read out by the arithmetic unit after the data DA1 is read out by the arithmetic unit. Therefore, when the arithmetic processing is braked for the debugging operations, the program executed in the arithmetic unit is stopped at a step not relating to the data DA2.

As mentioned above, even though the arithmetic processing executed in the arithmetic unit is scheduled to be braked for the debugging operations when the data DA2 relating to the cache miss is read out from the cache memory to the arithmetic unit, it is impossible to specify the data DA2 because the sequential pieces of data including the data DA2 are fetched in a block unit.

Accordingly, the efficiency for specifying the data for the debugging operations deteriorates, and it is impossible to reliably specify which step is executed in the program.

Therefore, it is impossible to immediately brake the arithmetic processing according to an interruption operation of the debugging operations when the data DA2 relating to the cache miss is read out from the cache memory after the data DA2 is fetched from the external memory. That is, it is difficult to sufficiently execute the debugging operations.

On the other hand, there is another method that the microprocessor is operated according to simplified operations in which the cache memory is not used when the debugging operations are executed to prevent the efficiency for specifying the data DA2 from deteriorating.

However, the frequency that pieces of data are transmitted to the external bus according to the simplified operations is different from that in the normal operations in which the cache memory is used. In addition, the execution time of the program in the simplified operations is also different from that in the normal operations.

Therefore, there is a drawback that the debug operations cannot be efficiently executed while executing the normal operations.

SUMMARY OF THE INVENTION

It is an object of the present invention to provide a microprocessor with a cache memory in which a piece of data is easily detected when the data is utilized for the arithmetic processing.

The object is achieved by the provision of a microprocessor with a cache memory for supporting debugging operations with debugging supporting means while executing arithmetic processing in arithmetic-logic means by utilizing pieces of data stored in an external memory, the debugging supporting means comprising:

a holding section for holding a designated address AD1;

a detecting section for detecting an address signal indicating the designated address AD1 held in the holding section from among address signals provided from the arithmetic-logic means to an external address bus, and the arithmetic-logic means arranged away from the supporting means comprising:

a cache memory for storing each of pieces of data at an address;

a tag memory for storing addresses existing in the cache memory;

an arithmetic unit for reading out a piece of data stored in the cache memory and executing the arithmetic processing while utilizing the data;

a control section for sending an address checking signal to the tag memory to check whether or not an address AD2 is stored in the tag memory when a piece of data stored at the address AD2 of the cache memory is required by the arithmetic unit, providing a group of address signals which indicates a group of addresses AD including the address AD2 to the external address bus to fetch pieces of data DA stored at the address AD of the external memory in cases where the address AD2 is not stored in the tag memory, providing the addresses AD to the tag memory, and providing the pieces of data DA stored in the external memory to the cache memory;

a tagging section for tagging the designated address AD1 stored in the tag memory under control of the control section when the address signal indicating the designated address AD1 is detected by the detecting section of the debugging supporting means; and a command signal generating section for generating a command signal when the designated address AD1 tagged by the tagging section is accessed by the address checking signal sent by the control section, and providing the command signal to the control section to brake the arithmetic processing executed in the arithmetic section, wherein the arithmetic processing executed in the arithmetic unit is braked under control of the control section after the command signal is provided to the control section.

In the above configuration, in cases where debugging operations are implemented to debug a program executed in the arithmetic unit, a designated address AD1 is held in advance in the holding section because the program is scheduled to be debugged when a piece of data DA1 stored at the designated address AD1 of the external memory is read out to the arithmetic unit.

In the above condition, when a piece of data stored at an address AD2 of the cache memory is read out to the arithmetic unit during the arithmetic processing, an address checking signal is transmitted to the tag memory from the control section to check whether or not the address AD2 is stored in the tag memory. When the address AD2 is stored in the tag memory, an address hit occurs. In this case, the data stored at the address AD2 of the cache memory is read out to the arithmetic unit to continue the arithmetic processing executed in the arithmetic unit.

On the other hand, when the address AD2 is not stored in the tag memory, a cache miss occurs. In this case, a group of address signals is transmitted to the external address bus under control of the control section to fetch pieces of data DA stored at addresses AD of the external memory. One of the addresses AD is the address AD2.

In addition, the address signals transmitted to the external address bus are monitorred by the detecting section to detect an address signal indicating the designated address AD1 held in the holding section. Therefore, when the address signal indicating the designated address AD1 is included in the address signals, the designated address AD1 is provided to the tag memory by the control section, and the designated address AD1 in the tag memory is tagged by the tagging section.

Therefore, only the designated address AD1 held in the holding section is tagged in the tag memory.

Thereafter, when whether or not the designated address AD1 is stored in the tag memory is checked with an address checking signal by the control section to read out the data DA1 from the cache memory to the arithmetic unit, a command signal is generated by the command signal generating section to brake the arithmetic processing executed in the arithmetic unit.

Accordingly, when the data DA1 stored at the designated address AD1 of the external memory is read out to the arithmetic unit, the arithmetic processing can be reliably braked by the command signal because the designated address AD1 is tagged in the tag memory.

Also, the debugging supporting means can be detached from the arithmetic means because the debugging supporting means is arranged away from the arithmetic means. Therefore, in cases where the debugging operations are not required in the arithmetic means, other debugging operations can be executed in another arithmetic means while utilizing the debugging supporting means.

In addition, because the debugging supporting means is arranged away from the arithmetic means and the debugging supporting means is not put in the arithmetic means, relatively small size of arithmetic means can be manufactured. Accordingly, a large number of arithmetic means can be manufactured at a moderate price.

The object is also achieved by the provision of a microprocessor with a cache memory for supporting debugging operations with debugging supporting means while executing arithmetic processing in arithmetic-logic means by utilizing pieces of data stored in an external memory, the debugging supporting means comprising:

a holding section for holding a designated data DA1;

a detecting section for detecting a piece of data agreeing with the designated data DA1 held in the holding section from among a group of pieces of data provided from the external memory to an external data bus, and the arithmetic-logic means arranged away from the supporting means comprising:

a cache memory for storing each of pieces of data at an address;

a tag memory for storing addresses existing in the cache memory;

an arithmetic unit for reading out a piece of data stored in the cache memory and executing the arithmetic processing while utilizing the data;

a control section for sending an address checking signal to the tag memory to check whether or not an address AD2 is stored in the tag memory when a piece of data DA2 stored at the address AD2 of the cache memory is required by the arithmetic unit, providing a group of address signals which indicates a group of addresses AD including the address AD2 to an external address bus to fetch pieces of data DA including data DA2 stored at the addresses AD of the external memory through the external data bus in cases where the address AD2 is not stored in the tag memory, providing the addresses AD to the tag memory, and providing the pieces of data DA stored in the external memory to the cache memory;

a tagging section for tagging the address AD1 stored in the tag memory under control of the control section when the data agreeing with the designated data DA held in the holding section is detected by the detecting section of the debugging supporting means; and a command signal generating section for generating a command signal when the address AD1 tagged by the tagging section is accessed by the address sent by the control section, and providing the command signal to the control section to brake the arithmetic processing executed in the arithmetic section, wherein the arithmetic processing executed in the arithmetic unit is braked under control of the control section after the command signal is provided to the control section.

In the above configuration, in cases where debugging operations are implemented to debug a program executed in the arithmetic unit, a piece of designated data DA1 is held in advance in the holding section because the program is scheduled to be debugged when the designated data DA1 stored in an address AD1 is read out to the arithmetic unit after the data DA1 is read out from the external memory to the cache memory.

Therefore, when the designated data DA1 is read out from the external memory to the address AD1 of the cache memory, the address AD1 stored in the tag memory is tagged by the tagging section.

Accordingly, when the designated data DA1 stored at the address AD1 of the cache memory is read out to the arithmetic unit, the arithmetic processing can be reliably braked by the command signal because the address AD1 is tagged in the tag memory.

DESCRIPTION OF THE SPECIFIC EMBODIMENT

One preferred embodiment is described with reference to the drawings as follows.

Figure 2:
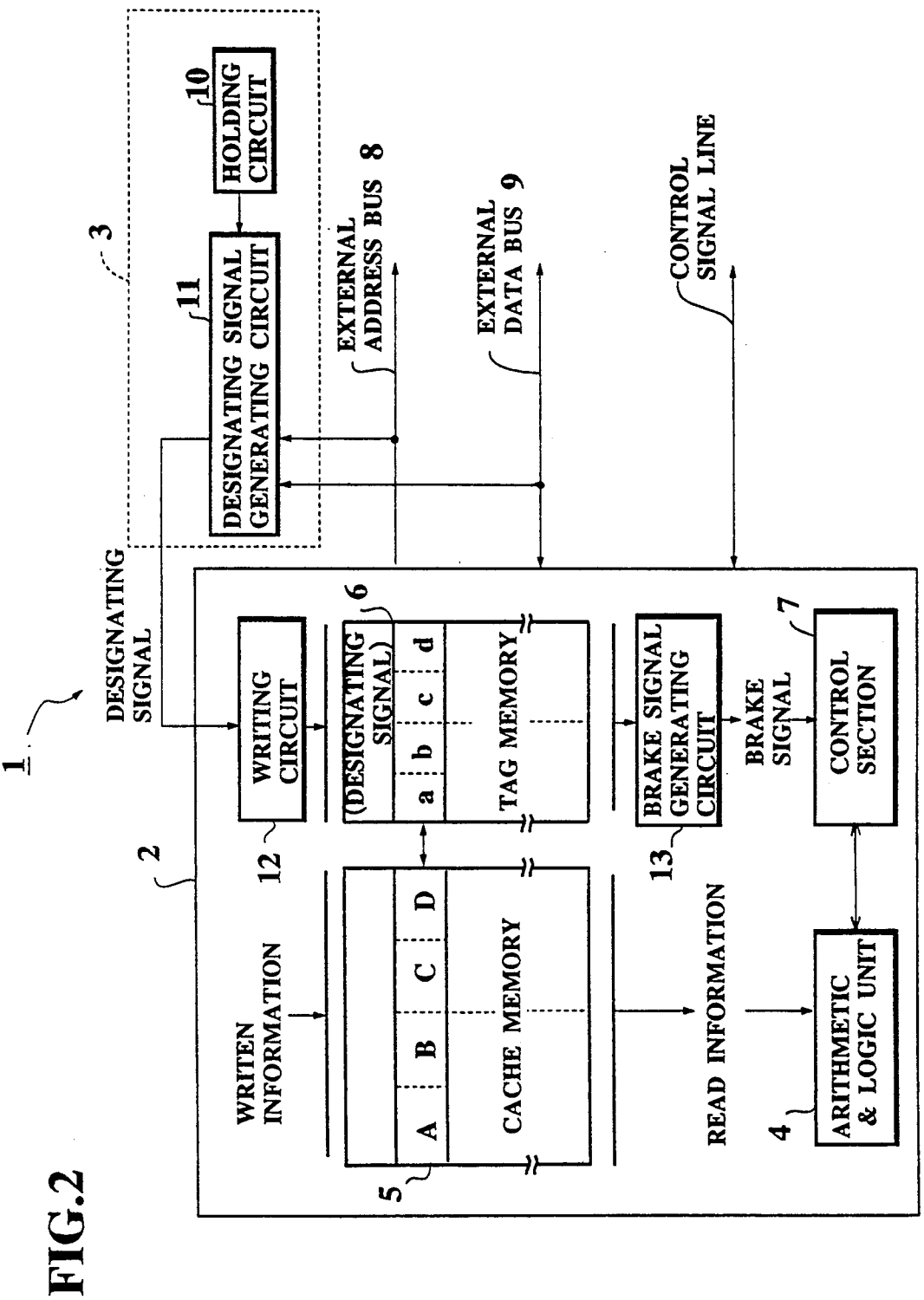
FIG. 2 is a block diagram of a microprocessor with a cache memory according to an embodiment of the present invention.

FIG. 2 is a block diagram of a microprocessor with a cache memory according to an embodiment of the present invention.

As shown in FIG. 2, a microprocessor 1 comprises an arithmetic section 2 for executing an arithmetic processing while utilizing pieces of data and instructions according to programs stored therein, a debugging operation supporting section 3 for supporting debugging operations executed in the arithmetic section 2, an external address bus 8 through which address signals are transmitted from the arithmetic section 2 to an external memory (not shown) while being monitorred by the debugging operation supporting section 3, and an external data bus 9 through which pieces of data are transmitted between the arithmetic section 2 and the external memory.

The arithmetic section 2 is generally provided with an arithmetic & logic unit 4 for executing the arithmetic processing according to the programs stored therein, a cache memory 5 for storing pieces of information such as pieces of data and instructions which each are stored at an address, a tag memory 6 for storing addresses at which the pieces of information are stored in the cache memory 5, a control section 7 for controlling the arithmetic processing executed in the arithmetic & logic unit 4 and providing a group of address signals to the external address bus 8 in synchronism with a bus cycle of the external address bus 8 and in serial order to fetch pieces of data which are stored at the addresses indicated by the address signals from the external memory through the external data bus 9 when a cache miss occurs.

Each of the addresses stored in the tag memory 6 has a tag which is set at either a "0" level or a "1" level".

The debugging operation supporting section 3 is arranged away from the arithmetic section 2. Therefore, the debugging operation supporting section 3 is connected with the arithmetic section 2 in cases where the debugging operations are executed while utilizing the debugging operation supporting section 3. Also, the debugging operation supporting section 3 is detached from the arithmetic section 2 in cases where the debugging operations are not executed and normal operations are executed.

In the above configuration of the arithmetic section 2, parts of the debugging operations which are common to the normal operations are described.

When a piece of data DA stored at an address AD of the cache memory 5 is required by the arithmetic & logic unit 4 during arithmetic processing executed in the unit 4 according to a program, an address checking signal is provided from the control section 7 to the tag memory 6 to check whether or not the address AD designated by the address checking signal is stored in the tag memory 6. When the address AD is stored in the tag memory 6, an address hit occurs. Thereafter, a data designating signal is provided from the arithmetic & logic unit 4 to the cache memory 5 to read the data DA stored at the address AD. In this case, the data DA is necessarily stored in the cache memory 5 because the address AD is stored in the tag memory 6.

Figure 1:
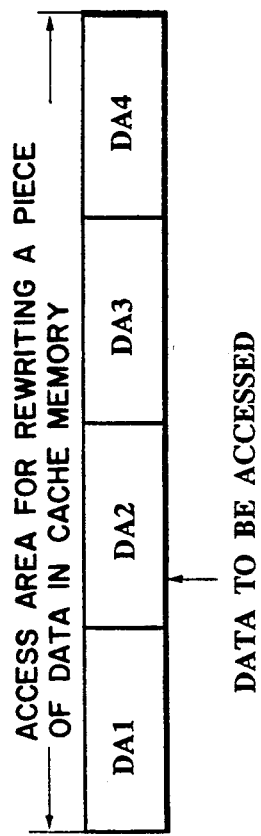
FIG. 1 is a structural diagram showing a block of pieces of data fetched from an external memory to a cache memory.
Figure 3:
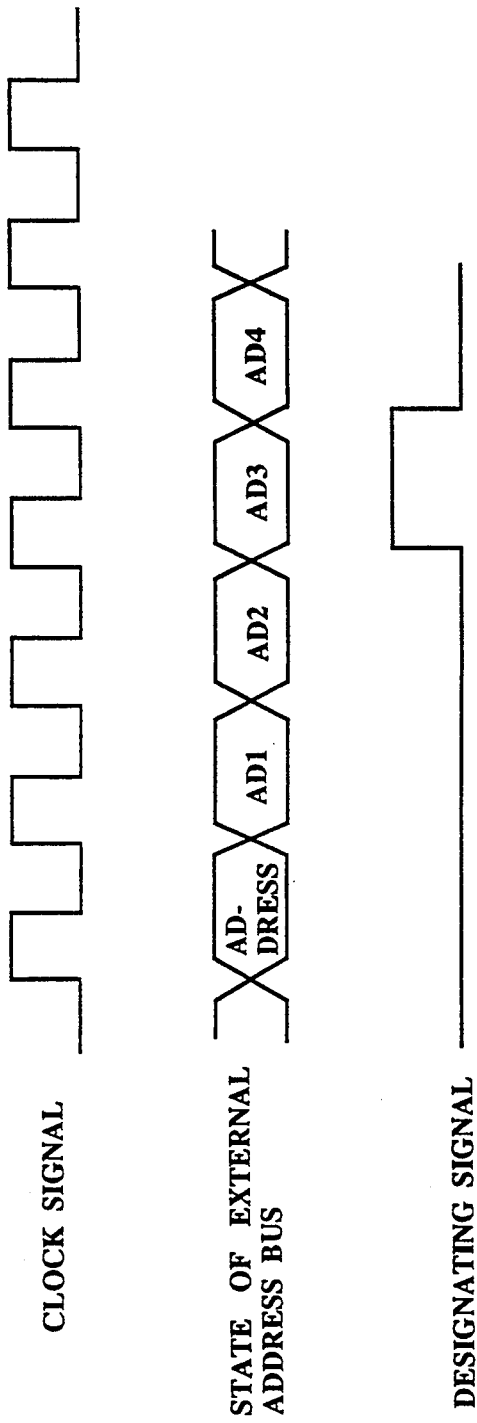
FIG. 3 is a timing chart showing that address signals are transmitted from the microprocessor shown in FIG. 2 to an external address bus in synchronism with clock signals.

On the other hand, when the address AD is not stored in the tag memory 6, a cache miss occurs. This means that the data DA required for the arithmetic processing which is executed in the arithmetic & logic unit 4 is not stored in the cache memory 5. Therefore, the arithmetic processing executed in the arithmetic & logic unit 4 is halted for a short time. Thereafter, a group of address signals which indicates a group of addresses is provided to the external address bus 8 to fetch pieces of data stored at the addresses of the external memory (not shown) into the cache memory 5 under control of the control section 7. One of the signals indicates the address AD. Therefore, the data DA stored at the address AD of the external memory is fetched into the cache memory 5. In this case, the combination of the addresses indicated by the group of address signals is determined on condition that the pieces of data stored at the addresses are significantly likely to be read by the arithmetic & logic unit 4 in sequence. In addition, the address signals transmitted to the external address bus 8 is synchronized with clock signals determining the bus cycle of the external address bus 8, as shown in FIG. 3.

Thereafter, a group of the pieces of data stored at the addresses indicated by the address signals is fetched from the external memory to the cache memory 5 through the external data bus 9 under control of the control section 7 in serial order. In addition, the addresses which are indicated by the address signals transmitted to the external address bus 8 are written in the tag memory 6 under control of the control section 7. Thereafter, the data DA fetched from the external memory is read out from the cache memory 5 to the arithmetic & logic unit 4 so that the arithmetic processing is resumed in the arithmetic & logic unit 4.

Next, the configuration of the debug supporting section 3 which is utilized for the debugging operations and is not utilized for the normal operations is described.

The debug supporting section 3 comprises a holding section 10 for holding in advance a debugging address to be monitored during the debugging operations, and a designating signal generating section 11 for generating a group of designating signals each time a group of address signals transmitted through the external address bus 8 is detected therein. Each of the designating signals is formed by a binary digit such as "0" or "1".

In cases where any of the addresses indicated by the address signals detected in the section 11 do not agree with the debugging address held in the section 10, the designating signals designate "0" level. On the other hand, in cases where one of the addresses agrees with the debugging address, the designating signal generated by the detection of the address signal which indicates the address agreeing with the debugging address designates "1" level, and the other designating signals designate "0" level.

The arithmetic section 2 is further provided with a writing circuit 12 for writing the levels designated by the designating signals generated in the generating section 11 in the tags of the addresses stored in the tag memory 6, and a brake signal generating circuit 13 for generating a brake signal which is transmitted to the control section 7 to brake the arithmetic processing executed in the arithmetic & logic unit 4.

Therefore, a tag of an addresses in the tag memory 6 is set at a level "0" or "1" designated by a designating signal which is generated when an address signal indicating the address is detected in the circuit 11.

When an address checking signal is transmitted from the arithmetic & logic unit 4 to the tag memory 6 to check whether or not a piece of address designated by the address checking signal is stored in the tag memory 6, level information expressing the level set at the address is sent to the circuit 13. In cases where the level "0" is expressed by the level information, no brake signal is generated in the circuit 13. On the other hand, in cases where the level "1" is expressed by the level information, a brake signal is generated in the circuit 13 to brake the arithmetic processing executed in the unit 4.

In the above configuration of the microprocessor 1, remaining parts of the debugging operations is described.

When a cache miss occurs in the arithmetic section 2 in the same manner as in the normal operations, a group of address signals is transmitted to the external address bus 8 under control of the control section 7. One of the address signals corresponds to an address relating to the cache miss.

The address signals transmitted to the external address bus 8 from the arithmetic section 2 in serial order and in synchronism with the bus cycle are always monitored by the designating signal generating circuit 11 in the debug supporting section 3. For example, as shown in FIG. 3, when four address signals which indicate addresses AD1 to AD4 are detected by the circuit 11 during the monitor, four designating signals are provided from the unit 11 to the writing circuit 12 in the arithmetic section 2 in serial order and in synchronism with the bus cycle. The designating signals correspond to the addresses AD1 to AD4 and are set at the "0" level in cases where the addresses AD1 to AD4 differ from the debugging address held in the holding circuit 10. However, when an address signal which indicates an address agreeing with the debugging address is detected by the unit 11, the designating signal corresponding to the address signal designates the "1" level. In this embodiment, the address AD3 agrees with the debugging address for convenience' sake.

When the designating signals corresponding to the address signals which indicate the addresses AD1 to AD4 are provided to the writing circuit 12 in the arithmetic section 2 from the designating signal generating circuit 11 in serial order, the levels of the tag of the addresses AD1 to AD4 are set by the designating signals so that four pieces of level information LI1 to LI4 are stored in the tag memory 6. Therefore, the only level information LI3 expresses that the tag of the address AD3 is set at the "1" level in this embodiment.

Accordingly, when a group of the address signals are transmitted to the external address bus 8 after the cache miss occurs, pieces of level information LI1 to LI4 are written into the tag memory 6 while relating the pieces of level information LI1 to LI4 to the addresses AD1 to AD4 stored into the tag memory 6.

Thereafter, when a piece of data corresponding to an address is required by the arithmetic & logic unit 4 during the arithmetic processing according to the program, an address checking signal is provided to the tag memory 6 from the control section 7 to check whether or not the address is stored in the tag memory 6. In cases where the address is stored in the tag memory 6, a data designating signal is provided to the cache memory 5 from the arithmetic & logic unit 4 under control of the control section 7 to read out the data corresponding to the address.

In the tag memory 6, a piece of level information relating to the address is provided to the brake signal generating circuit 13. In cases where the address required by the arithmetic & logic unit 4 does not agree with the debugging address AD3, because the level information LI1, LI2, or LI4 provided to the generating circuit 13 expresses the "0" level, a brake signal is not generated in the brake signal generating circuit 13. In other words, the arithmetic processing in the arithmetic & logic unit 4 is continued after the data corresponding to the address AD1, AD2, or AD4 is read from the cache memory 5.

On the other hand, in cases where an address required by the arithmetic & logic unit 4 agrees with the debugging address AD3, the level information LI3 provided to the generating circuit 13 expresses the "1" level. Therefore, a brake signal is generated in the brake signal generating circuit 13 so that the arithmetic processing in the arithmetic & logic unit 4 is braked under control of the control section 7. In other words, all of the operations executed in the microprocessor 1 are halted and the microprocessor 1 is conditioned so as to debug the program.

Accordingly, because the address AD3 relating to the debugging operations is held in advance in the holding circuit 10 and the address signals transmitted through the external generating circuit 11, the level information LI3 can express the level "1" to immediately generate a brake signal in cases where the data DA3 stored at the address AD3 is read out from the cache memory 5 to the arithmetic & logic unit 4. Therefore, the operations in the arithmetic section 2 can be braked to debug the program. In short, it is possible to improve the efficiency for designating the data relating to the debugging operations.

In addition, because the debugging operations can be easily implemented in the same manner as in the normal operations in which the cache memory is utilized, it is possible to efficiently implement the debugging operations even though the microprocessor is provided with the cache memory.

Also, because the debugging operation supporting section 3 can be detached from the arithmetic section 2, other debugging operations can be executed in another arithmetic section (not shown) while utilizing the debugging operation supporting section 3 in cases where the debugging operations are not required in the arithmetic section 2.

Furthermore, because the debugging operation supporting section 3 is not put in the arithmetic section 2, relatively small size of arithmetic section 2 can be manufactured. Accordingly, a large number of arithmetic sections can be manufactured at a moderate price.

Though the designating signal is generated after the address agreeing with the debugging address is detected in the above embodiment, it is preferable that a piece of debugging data to be detected be held in the unit 10 during the arithmetic processing and a designating signal formed by the binary digit "1" be provided to the arithmetic section 2 when a piece of data fetched into the arithmetic section 2 through the external data bus 9 agrees with the debugging data.

Also, in cases where only one address signal is transmitted to the external address bus 8 to fetch four piece of data from the external data bus 9 according to a type of protocol, it is preferable that a designating signal corresponding to no debugging address be actually transmitted to the arithmetic section 2 on condition that a type of calculation is executed in the designating signal generating circuit 11 to find out that a piece of data stored at an address agreeing with a debugging address stored in the holding circuit 10 is fetched.

Moreover, it is preferable that an annunciating signal for annunciating that a piece of designated data is read out from the cache memory 5 be provided to an operator without generating a brake signal when a "1" level designating signal is read out from the tag memory 6. In this embodiment, a suitable processing can be automatically executed without halting the microprocessor in the debug operations.

Still moreover, pieces of operand data or instructions can be stored in the cache memory 5.

Furthermore, though the debugging operation supporting section 3 is connected with the arithmetic section 2 in cases where the debugging operations are executed while utilizing the debugging operation supporting section 3 in the above embodiment, it is preferable that a conventional arithmetic section provided with only the arithmetic & logic unit 4, the cache memory 5, the tag memory 6 and the control section 7 be utilized for the normal operation without utilizing the microprocessor 1. In this case, the microprocessor 1 for executing the debugging operations is exchanged for the conventional arithmetic section 2 in cases where the debugging operations are executed.

Having illustrated and described the principles of our invention in a preferred embodiment thereof, it should be readily apparent to those skilled in the art that the invention can be modified in arrangement and detail without departing from such principles. We claim all modifications coming within the sprit and scope of the accompanying claims.

What is claims is:

1. A microprocessor for supporting debugging operations while executing arithmetic processing by utilizing pieces of data stored in an external memory, said microprocessor comprising:

arithmetic-logic means for executing arithmetic processing by utilizing said pieces of data; and debugging supporting means comprising a holding section for holding a designated address AD1, and a detecting section for detecting an address signal indicating said designated address AD1 held in said holding section from among address signals provided from said arithmetic-logic means to an external address bus;

said arithmetic-logic means being located separately from said debugging supporting means and comprising a cache memory for storing each piece of said data at an address, a tag memory for storing addresses existing in said cache memory, an arithmetic unit for reading out a piece of data stored in said cache memory and executing arithmetic processing utilizing said piece of data, a control section for sending an address checking signal to said tag memory to check whether or not an address AD2 is stored in said tag memory when a piece of data stored at said address AD2 of said cache memory is required by said arithmetic unit, providing a group of address signals which indicates a group of addresses AD including said address AD2 to said external address bus to fetch pieces of data DA stored at addresses AD of said external memory in cases where said address AD2 is not stored in said tag memory, providing said addresses AD to said tag memory, and providing said pieces of data DA stored in said external memory to said cache memory, a tagging section for tagging said designated address AD1 with a designating signal stored in said tag memory under control of said control section when the said address signal indicating said designated address AD1 is detected by said detecting section of said debugging supporting means, and a command signal generating section for generating a command signal when said designated address AD1 tagged by said tagging section is accessed by said address checking signal sent by said control section, and for providing said common signal to said control section to brake said arithmetic processing executed in said arithmetic unit, wherein said arithmetic processing executed in said arithmetic unit is braked under control of said control section after said command signal is provided to said control section.

2. A microprocessor according to claim 1 in which said command signal generated by said command signal generating section is an annunciation signal which annunciates that a piece of data DA1 stored at said designated address AD1 is accessed and read out to said arithmetic unit from the said cache memory.

3. A microprocessor according to claim 1 in which said command signal generated by said command signal generating section is a brake signal which forcibly halts arithmetic processing executed in said arithmetic unit under control of said control section.

4. A microprocessor according to claim 1 in which said designated address AD1 is tagged with a binary digit in said tagging section.

5. A microprocessor with a cache memory for supporting debugging operations while executing arithmetic processing by utilizing pieces of data stored in an external memory, said microprocessor comprising:

arithmetic-logic means for executing arithmetic processing by utilizing said pieces of data; and debugging supporting means comprising
a holding section for holding designated data DA1;
a detecting section for detecting a piece of data agreeing with said designated data DA1 held in said holding section from among a group of pieces of data provided from said external memory to an external data bus;

said arithmetic-logic means being located separately from said debugging supporting means and comprising said cache memory for storing each piece of said data at an address, a tag memory for storing addresses existing in said cache memory, an arithmetic unit for reading out a piece of data stored in said cache memory and executing arithmetic processing utilizing said piece of data, a control section for sending an address checking signal to said tag memory to check whether or not an address AD2 is stored in said tag memory when a piece of data DA2 stored at said address AD2 of said cache memory is required by said arithmetic unit, providing a group of address signals which indicates a group of addresses AD including said address AD2 to an external address bus to fetch pieces of data DA including data DA2 stored at said addresses AD of said external memory through said external data bus in cases where said address AD2 is not stored in said tag memory, providing said addresses AD to said tag memory, and providing said pieces of data DA stored in said external memory to said cache memory, a tagging section for tagging said address AD1 with a designating signal stored in said tag memory under control of said control section when data agreeing with said designated data DA held in said holding section is detected by said detecting section of said debugging supporting means and a command signal generating section for generating a command signal when said address AD1 tagged by said tagging section is accessed by said address sent by said control section, and providing said command signal to said control section to brake arithmetic processing executed in said arithmetic unit, wherein said arithmetic processing executed in said arithmetic unit is braked under control of said control section after said command signal is provided to said control section.

6. A microprocessor according to claim 5 in which said command signal generated by said command signal generating section is a brake signal which forcibly halts arithmetic processing executed in said arithmetic unit under control of said control section.

7. A microprocessor according to claim 5 in which said command signal generated by said command signal generating section is an annunciating signal which annunciates that said designated data DA1 is accessed and read out to said arithmetic unit from said cache memory.

8. A microprocessor according to claim 5 in which said designated address AD1 is tagged with a binary digit in said tagging section.

* * * * *